(12) United States Patent
Huh et al.

(10) Patent No.: US 9,380,408 B2
(45) Date of Patent: Jun. 28, 2016

(54) SYSTEM AND METHOD FOR APPLICATION DRIVING SERVICE

(71) Applicant: SK PLANET CO., LTD., Gyeonggi-Do (KR)

(72) Inventors: Jae Hyung Huh, Gyeonggi-Do (KR); Ki Chon Kang, Seoul (KR)

(73) Assignee: SK PLANET CO., LTD. (KR)

( * ) Notice: Subject to any disclaimer, the term of this patent is extended or adjusted under 35 U.S.C. 154(b) by 0 days.

(21) Appl. No.: 14/519,232

(22) Filed: Oct. 21, 2014

(65) Prior Publication Data
US 2016/0014546 A1    Jan. 14, 2016

(30) Foreign Application Priority Data
Jul. 9, 2014    (KR) .................. 10-2014-0086102

(51) Int. Cl.
*H04W 4/00*    (2009.01)
*H04W 4/02*    (2009.01)

(52) U.S. Cl.
CPC ............... *H04W 4/008* (2013.01); *H04W 4/02* (2013.01)

(58) Field of Classification Search
CPC ..................................................... H04W 4/008
USPC ................................................ 455/41.1, 41.2
See application file for complete search history.

(56) References Cited

U.S. PATENT DOCUMENTS 6,697,730 B2 *    2/2004    Dickerson ..................... 701/465
2015/0266377 A1 *    9/2015    Hampiholi et al. ........ 455/412.2

* cited by examiner

*Primary Examiner* — Tuan H Nguyen
(74) *Attorney, Agent, or Firm* — Baker Hostetler LLP

(57) ABSTRACT

The present invention relates to an application driving service system and method which is capable of solving unnecessary application redundant driving in a terminal in a procedure of providing a service using a beacon device, for example, a Bluetooth-based information providing service, a driving policy providing apparatus applied thereto, and a method for operating the apparatus.

11 Claims, 4 Drawing Sheets

SYSTEM AND METHOD FOR APPLICATION DRIVING SERVICE

CROSS-REFERENCE TO RELATED APPLICATION

This application claims the benefit of Korean Application No. 10-2014-0086102, filed on Jul. 9, 2014, with the Korean Intellectual Property Office, the disclosure of which is incorporated herein by reference.

BACKGROUND OF THE INVENTION

1. Field of the Invention

The present invention relates to an application driving service system and method which is capable of solving unnecessary application redundant driving in a terminal in a procedure of providing a service using a beacon device, for example, a Bluetooth-based information providing service, a driving policy providing apparatus applied thereto, and a method for operating the apparatus.

2. Description of the Related Art

In recent years, terminals have increasingly employed a variety of local wireless communication techniques, among which a Bluetooth technique facilitates local wireless communication within a distance of about 10 meters.

In this connection, there appears a service of using a Bluetooth technique employed for a terminal to automatically provide required information (for example, coupons, discount information, store information and so on) to the terminal when the terminal approaches or enters a particular location such as a store or a building (hereinafter referred to as a Bluetooth-based information providing service).

In brief, the Bluetooth-based information providing service is a service where a BLE (Bluetooth Low Energy) beacon device installed in a particular location such as a store or a building consistently broadcasts its own unique identification information (UID) and, as a terminal approaches or enters the particular location, a BLE terminal agent being executed as a background in the terminal receives (recognizes) the unique identification information (DID) broadcast by the beacon device and automatically drives an application for Bluetooth-based information providing service (hereinafter referred to as an information providing service application) installed in the terminal.

Then, the terminal can access a service server through the information providing service application driven in the terminal and receive and use information (for example, coupons, discount information, store information and so on) based on the unique identification information (UID) from the service server.

In this manner, for the Bluetooth-based information providing service, when a terminal user who approaches or enters the particular location such as a store or a building, since required or useful information is provided to the user without any manipulation by the user, the service is being increasingly used and the type and number of applications are being greatly increased with active development of information providing service applications.

In addition, in recent years, the number of information providing service applications installed in terminals has increased.

When a plurality of information providing service applications is installed in a terminal, upon recognizing unique identification information (UID) of a beacon device, a BLE terminal agent in the terminal simultaneously drives the plurality of information providing service applications which receives the same information (for example, coupons, discount information, store information and so on) based on the single unique identification information (UID).

In the end, for the existing Bluetooth-based information providing service, if the plurality of information providing service applications is installed in the terminal, the plurality of information providing service applications is unnecessarily driven simultaneously (redundantly), which may result in inconvenience of a user and wasteful increase in the amount of used data.

To overcome this problem, the present invention suggests a method and system for solving unnecessary application redundant driving in a terminal in a procedure of providing a Bluetooth-based information service.

SUMMARY OF THE INVENTION

Accordingly, it is an object of the present invention to provide an application driving service system and method in which a terminal recognizes unique identification information of a particular location, transmits the recognized unique identification information, and receives a driving policy related to the unique identification information, and a driving policy providing apparatus receives the unique identification information from the terminal, checks an application list mapped to the unique identification information and driving priorities of applications contained in the application list, provides a driving policy including the checked application list and driving priorities, and selects and drives a particular application depending on the provided driving policy when the terminal recognizes the unique identification information, thereby solving unnecessary application redundant driving in a terminal in a procedure of providing a service using a beacon device.

It is another object of the present invention to provide an application driving service apparatus and method which is capable of receiving unique identification information of a particular location recognized by a terminal, checking an application list mapped to the unique identification information and driving priorities of applications contained in the application list, and providing a driving policy including the checked application list and driving priorities and selecting and driving a particular application depending on the provided driving policy when the terminal recognizes the unique identification information, thereby solving unnecessary application redundant driving in a terminal in a procedure of providing a service using a beacon device.

To achieve the above objects, according to an aspect of the invention, there is provided a driving policy providing apparatus including: an identification information receiving unit which receives unique identification information of a particular location recognized by a terminal; a list and priority checking unit which checks an application list mapped to the unique identification information and driving priorities of applications contained in the application list; and a driving policy providing unit which provides a driving policy including the checked application list and driving priorities and selects and drives a particular application depending on the provided driving policy when the terminal recognizes the unique identification information.

In some embodiment, the driving policy may include a policy to select an application contained in the application list and having the highest driving priority, among existing applications installed in the terminal, as the particular application.

In some embodiment, a beacon device which transmits a RF signal capable of being received in only a terminal located within a particular distance may be installed in the particular location, and the unique identification information may be information recognized through the RF signal received from the beacon device by the terminal located within a particular distance from the beacon device.

In some embodiment, the driving policy providing apparatus may further include a driving policy managing unit which provides at least one of functions of registration, inquiry, change and deletion for the application list and driving priorities included in a driving policy of a particular location at a request from an authenticated terminal in association with the particular location.

In some embodiment, the driving policy providing apparatus may further include an installation guiding unit which guides installation of at least one application, which is selected from the existing information providing service applications contained in the application list depending on driving priority of applications contained in the application list, in the terminal when failure information indicating failure in selecting the particular application is returned from the terminal to the driving policy providing apparatus.

According to another aspect of the invention, there is provided a method for operating a driving policy providing apparatus, including: receiving unique identification information of a particular location recognized by a terminal; checking an application list mapped to the unique identification information and driving priorities of applications contained in the application list; and providing a driving policy including the checked application list and driving priorities and selecting and driving a particular application depending on the provided driving policy when the terminal recognizes the unique identification information.

In some embodiment, the driving policy may include a policy to select an application contained in the application list and having the highest driving priority, among existing applications installed in the terminal, as the particular application.

In some embodiment, a beacon device which transmits a RF signal capable of being received in only a terminal located within a particular distance may be installed in the particular location, and the unique identification information may be information recognized through the RF signal received from the beacon device by the terminal located within a particular distance from the beacon device.

In some embodiment, the method may further include providing at least one of functions of registration, inquiry, change and deletion for the application list and driving priorities included in a driving policy of a particular location at a request from an authenticated terminal in association with the particular location.

According to another aspect of the invention, there is provided a non-transitory computer-readable storage medium storing a computer program comprising a set of instructions, when executed, arranged to cause a computer to implement the above-described method.

According to another aspect of the invention, there is provided an application driving service system including: a terminal which recognizes unique identification information of a particular location, transmits the recognized unique identification information, and receives a driving policy related to the unique identification information; and a driving policy providing apparatus which receives the unique identification information from the terminal, checks an application list mapped to the unique identification information and driving priorities of applications contained in the application list, provides a driving policy including the checked application list and driving priorities, and selects and drives a particular application depending on the provided driving policy when the terminal recognizes the unique identification information.

According to the present invention, it is possible to provide an application driving service system and method which is capable of solving unnecessary application redundant driving in a terminal in a procedure of providing a service using a beacon device, thereby eliminating inconvenience of a user and wasteful increase in the amount of used data, a driving policy providing apparatus applied thereto, and a method for operating the apparatus

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

Hereinafter, a preferred embodiment of the present invention will be described with reference to the accompanying drawings.

Figure 1:
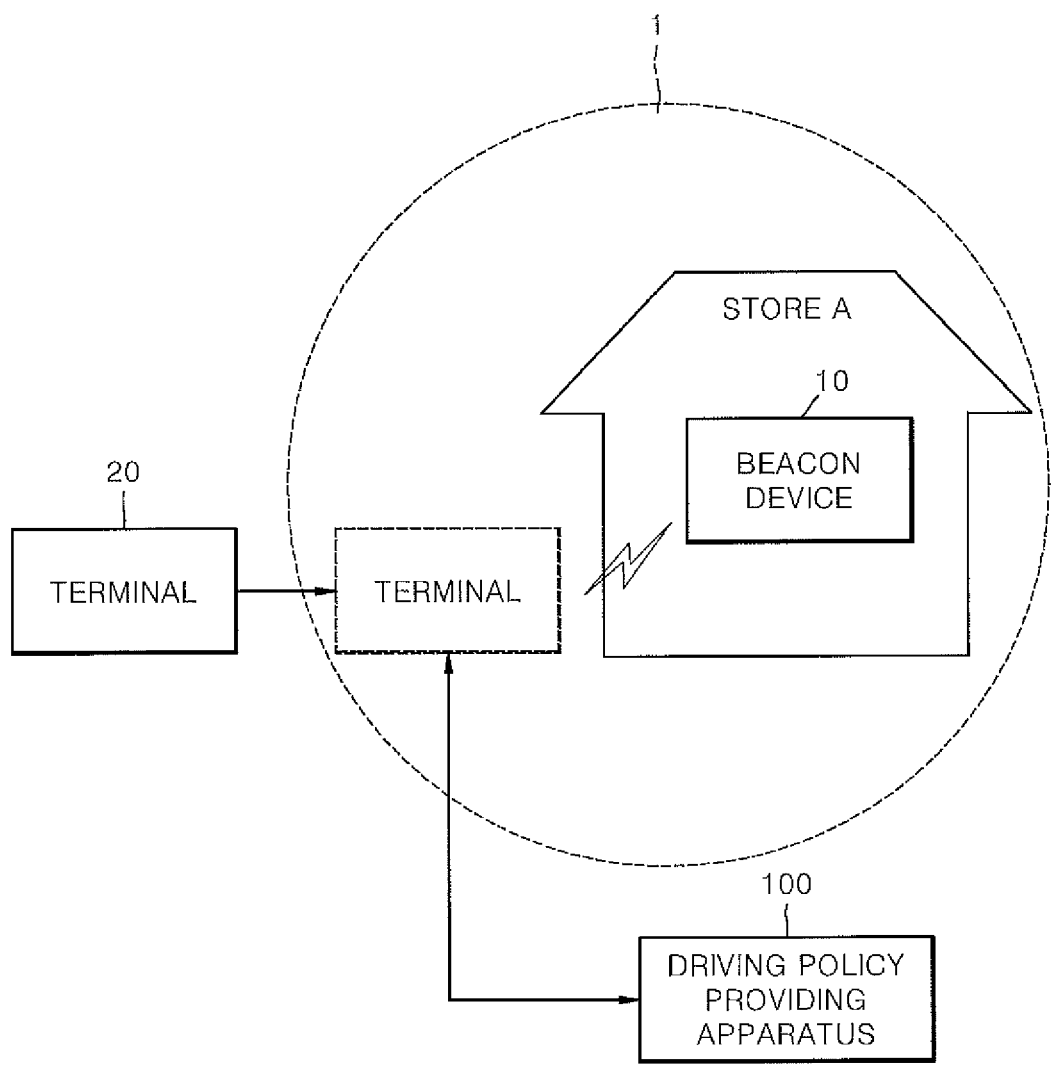
FIG. 1 is a view showing an application driving service system according to a preferred embodiment of the present invention.

FIG. 1 is a view showing an application driving service system according to a preferred embodiment of the present invention.

An application driving service system according to the present invention is a system for solving unnecessary application redundant driving in a terminal in using a local wireless communication technique employed for the terminal to automatically provide a service providing required information (for example, coupons, discount information, store information and so on) (hereinafter referred to as a local wireless communication-based information providing service) when the terminal approaches or enters a particular location such as a store or a building.

In the present invention, among various types of local wireless communication techniques capable of being installed in a terminal, a Bluetooth technique is particularly preferably used. Of course, in the present invention, local wireless communication techniques (for example, NFC and so on) other than the Bluetooth technique may be used.

Prior to describing the present invention in detail, an existing local wireless communication-based information providing service, that is, an existing Bluetooth-based information providing service, will be described in brief.

In the existing Bluetooth-based information providing service, a BLE (Bluetooth Low Energy) beacon device installed in a particular location such as a store or a building consistently broadcasts its own unique identification information (UID) and, as a terminal approaches or enters the particular location, a BLE terminal agent being executed as a background in the terminal receives (recognizes) the unique identification information (DID) broadcast by the beacon device and automatically drives an application for a Bluetooth-based information providing service (hereinafter referred to as an information providing service application) installed in the terminal.

Then, the terminal can access a service server through the information providing service application driven in the terminal and receive and use information (for example, coupons, discount information, store information and so on) based on the unique identification information (UID) from the service server.

For the existing Bluetooth-based information providing service as described earlier, if a plurality of information providing service applications is installed in the terminal, the plurality of information providing service applications is unnecessarily driven simultaneously (redundantly), which may result in inconvenience of a user and wasteful increase in the amount of used data.

To overcome this problem, the present invention suggests a method and system for solving unnecessary application redundant driving in a terminal in a procedure of providing a Bluetooth-based information service.

Referring to FIG. 1, an application driving service system according to the present invention includes a terminal 20 and a driving policy providing apparatus 100.

Upon recognizing identification information of a particular location, the terminal 20 transmits the recognized identification information to the driving policy providing apparatus 100.

Then, the terminal can receive a driving policy related to the identification information from the driving policy providing apparatus 100 of the present invention.

In this case, a beacon device 10 transmitting a radio frequency (RF) signal which can be received only in a terminal located within a certain distance is installed in the particular location and the identification information recognized by the terminal 20 is information recognized through the RF signal received from the beacon device 10 by the terminal 20 located within a particular distance from the beacon device 10.

More specifically, as shown in FIG. 1, location recognizing beacon devices are installed in various locations, including the beacon device 10 installed in the particular location, for example, a store A.

Among the beacon devices installed in various locations, the beacon device 10 of FIG. 1 installed in the particular location (for example, the store A) can transmit a RF signal which can be received only in a terminal located within a particular distance and accordingly consistently broadcast its own unique identification (UID) information, i.e., unique identification (UID) information of a location (for example, the store A) in which the beacon device 10 is installed.

In the following description, a region within the particular distance where the RF signal can be received from the beacon device 10 is referred to as a reception region 1.

The beacon device 10 may be a BLE (Bluetooth Low Energy) beacon device employing a Bluetooth wireless communication function.

The terminal 20 executes a BLE terminal agent as a background in the terminal in order to use a Bluetooth-based information providing service.

When the terminal 20 is located in the reception region 1 within the particular distance from the beacon device 10 as the terminal 20 approaches or enters the particular location (for example, the store A), the BLE terminal agent being executed as the background in the terminal 20 receives the RF signal from the beacon device 10.

The terminal 20 recognizes the unique identification information (UID) of the particular location (for example, the store A) broadcast by the beacon device 10 through the RF signal received from the beacon device 10.

Thereafter, in conventional methods, the BLE terminal agent being executed as the background in the terminal drives an application for Bluetooth-based information providing service (hereinafter referred to as an information providing service application) installed in the terminal.

However, in the present invention, the terminal 20 (i.e., the BLE terminal agent) transmits the unique identification information (UID) of the recognized location (for example, the store A) to the driving policy providing apparatus 100.

Upon receiving the unique identification information (UID) of the store A from the terminal 20, the driving policy providing apparatus 100 checks an application list mapped to the unique identification information (UID) of the store A and application driving priorities contained in the application list.

Then, the driving policy providing apparatus 100 provides a driving policy including the checked application list and application driving priorities to the terminal 20.

Upon recognizing the unique identification information (UID) of the particular location (for example, the store A), the terminal 20 can automatically receive (acquire) the driving policy related to the unique identification information (UID) and select and drive a particular information providing service application depending on the received driving policy.

Hereinafter, the driving policy providing apparatus according to a preferred embodiment of the present invention will be described in more detail with reference to FIG. 2.

The driving policy providing apparatus 100 according to the preferred embodiment includes an identification information receiving unit 110 which receives identification information of a particular location recognized by the terminal 20, a list and priority checking unit 120 which checks an application list mapped to the identification information and driving priorities of applications contained in the application list, and a driving policy providing unit 140 which provides a driving policy including the checked application list and driving priorities and selects and drives a particular application depending on the driving policy provided when the terminal 20 recognizes the identification information.

The identification information receiving unit 110 receives the identification information of the particular location recognized by the terminal 20.

Assuming the particular location as the store A as described above, when the terminal 20 is located in the reception region 1 within the particular distance from the beacon device 10 as the terminal 20 approaches or enters the particular location (the store A), the BLE terminal agent being executed as the background in the terminal 20 receives a RF signal from the beacon device 10.

The terminal 20 (i.e., the BLE terminal agent) transmits the unique identification information (UID) of the recognized location (the store A) to the driving policy providing apparatus 100.

Accordingly, the identification information receiving unit 110 can receive the unique identification information (UID) of the location (the store A) recognized by the terminal 20.

The list and priority checking unit 120 checks the application list mapped to the unique identification information (UID) and the application driving priorities contained in the application list, which are received from the identification information receiving unit 110.

In more detail, the driving policy providing apparatus 100 can manage the application list containing applications as candidates to be driven for a Bluetooth-based information providing service (hereinafter referred to as information providing service applications), which is mapped to each beacons or unique identification information (UID) and driving priorities of the information providing service applications contained in the application list.

Then, upon receiving the unique identification information (UID) of the particular location (the store A) from the identification information receiving unit 110, the list and priority checking unit 120 can check the application list mapped to the received unique identification information (UID) of the store A and the driving priorities of the applications contained in the application list.

For example, the application list mapped to the unique identification information (UID) of the store A and the driving priorities may be as shown in Table 1.

TABLE 1

| Driving Priority | Application List |
| --- | --- |
| 1 | AAA.apk |
| 1 | BBB.apk |
| 2 | CCC.apk |
| 3 | DDD.apk |
| 4 | EEE.apk |

The driving policy providing unit 140 provides a driving policy including the application list and driving priorities checked by the list and priority checking unit 120.

Then, upon recognizing the unique identification information (UID) of the particular location (the store A), the terminal 20 can automatically receive (acquire) the driving policy related to the unique identification information (UID) and select and drive a particular information providing service application depending on the received driving policy.

In this case, the driving policy is a policy to select an information providing service application contained in the driving policy application list and having the highest driving priority, among existing information providing service applications installed in the terminal 20, as the particular information service application.

Accordingly, the terminal 20, particularly, the BLE terminal agent being executed as the background in the terminal 20, can select the particular information providing service application contained in the driving policy application list and having the highest driving priority, among the existing information providing service applications installed in the terminal 20, depending on the policy, and can drive the selected particular information providing service application only.

For example, it is assumed that applications BBB.apk, CCC.apk and DDD.apk are installed in the terminal 20.

In this case, if the terminal 20 receives the driving policy including the application list and driving priorities as shown in Table 1, the terminal 20 can select the particular information providing service application BBB.apk contained in the driving policy application list and having the highest driving priority, among the existing information providing service applications BBB.apk, CCC.apk and DDD.apk installed in the terminal 20, depending on the policy, and can drive the selected particular information providing service application BBB.apk only.

Then, the terminal 20 can access a service server (not shown) through the application BBB.apk selected and driven depending on the driving policy and receive information (for example, coupons, discount information, store information and so on) based on the unique identification information (UID) of the store A from the service server (not shown).

As described above, according to the present invention, when a terminal using a Bluetooth-based information providing service recognizes unique identification information of a particular location through a RF signal of a beacon device, an optimal driving policy mapped to the unique identification information of the particular location is provided to the terminal and the terminal is caused to select and drive only an information providing service application contained in the driving policy application list and having the highest driving priority, among the information providing service applications installed in the terminal, depending on the driving policy, thereby preventing all information providing service applications installed in the terminal from being simultaneously (redundantly) driven.

On the other hand, even when the terminal 20 receives the driving policy including the application list and driving priorities as shown in Table 1, the terminal 20 may have no application contained in the driving policy application list among the existing information providing service applications installed in the terminal.

In this case, the terminal 20, particularly, the BLE terminal agent being executed as the background in the terminal 20, may not be able to choose an information providing service application, which has the highest driving priority and is contained in the driving policy application list, among the existing information providing applications installed in the terminal 20 in accordance with the driving policy.

In this case, the terminal 20, particularly, the BLE terminal agent being executed as the background in the terminal 20, can return failure information, which indicates failure in selecting the particular application, to the driving policy providing apparatus 100.

Figure 2:
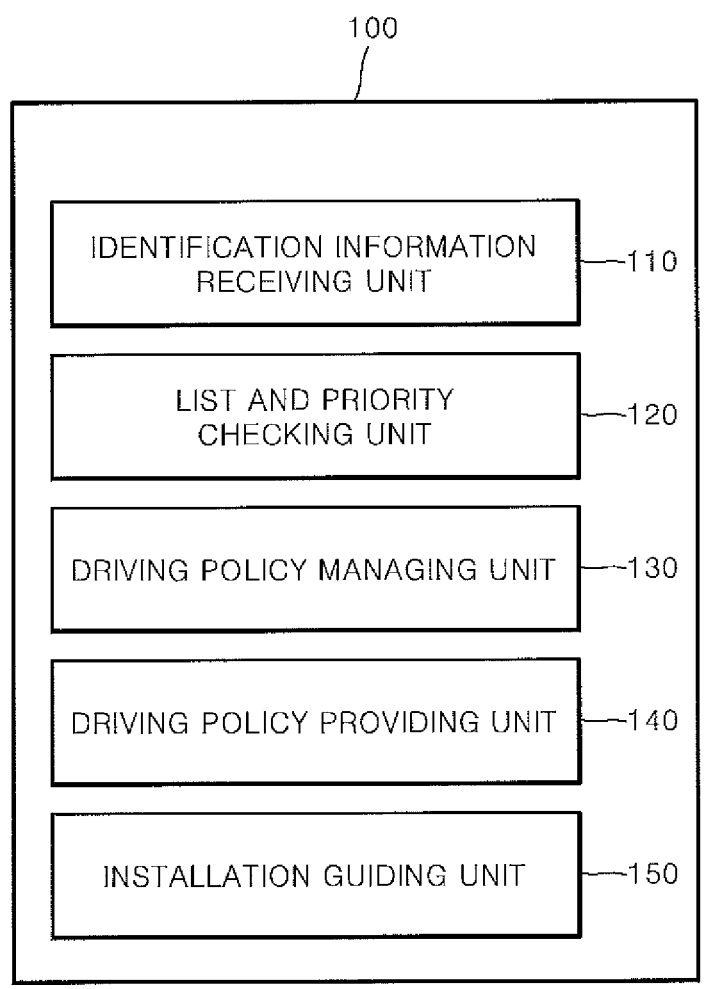
FIG. 2 is a view showing a driving policy providing apparatus according to a preferred embodiment of the present invention.

The driving policy providing apparatus 100 may further include an installation guiding unit 150, as shown in FIG. 2.

When the failure information indicating failure in selecting the particular application is returned from the terminal 20 to the driving policy providing apparatus 100, the installation guiding unit 150 can guide installation of at least one application, which is selected from the existing information providing service applications contained in the driving policy application list, in the terminal 20.

For example, if the driving policy including the application list and driving priorities as shown in Table 1 is provided to the terminal 20 and the failure information is returned from the terminal 20 to the driving policy providing apparatus 100, the installation guiding unit 150 can select at least one from the information providing service applications AAA.apk, BBB.apk, CCC.apk, DDD.apk and EEE.apk contained in the application list based on the driving priority.

For example, the installation guiding unit 150 can select a certain number of (for example, three) applications from the information providing service applications AAA.apk, BBB.apk, CCC.apk, DDD.apk and EEE.apk contained in the application list, in an order of descendant driving priority starting at the highest driving priority application. In this example, the installation guiding unit 150 will select the information providing service applications AAA.apk, BBB.apk and CCC.apk.

On the other hand, the installation guiding unit 150 may select the highest and next higher priority information providing service applications from the information providing service applications AAA.apk, BBB.apk, CCC.apk, DDD.apk and EEE.apk contained in the application list. In this case, the installation guiding unit 150 will select the information providing service applications AAA.apk, BBB.apk and CCC.apk.

The installation guiding unit 150 provides environments where the terminal 20, particularly, the BLE terminal agent being executed as the background in the terminal 20, can select a particular information providing service application depending on a driving policy upon recognizing the unique identification information (UID) of the store A through the beacon device 10 by providing at least one application selected as described above to the terminal 20 and guiding installation of the corresponding application in the terminal 20.

In addition, the system of the present invention can support user manipulation for the application list and driving priorities mapped/managed for unique identification information (UID).

To this end, the driving policy providing apparatus 100 according to the present invention may further include a driving policy managing unit 130, as shown in FIG. 2.

The driving policy managing unit 130 provides at least one of functions of registration, inquiry, change and deletion for the application list and driving priorities included in a driving policy of a particular location at a request from an authenticated terminal in association with the particular location.

In more detail, the authenticated terminal in association with the particular location (for example, the store A) refers to a terminal which accesses the driving policy providing apparatus 100 through a preset authentication procedure (for example, input of ID and password) by a manager (user) of the store A joined in the application driving service of the present invention.

When the authenticated terminal of the manager (user) of the store A accessing the driving policy providing apparatus 100 through the preset authentication procedure requests registration of a new information providing service application for the particular location (the store A), the driving policy managing unit 130 can provide the registration function to register the new information providing service application in the driving policy application list of the store A at the request for registration.

In addition, when the authenticated terminal of the manager (user) of the store A requests an inquiry for the application list and driving priorities of the particular location (the store A), the driving policy managing unit 130 can provide the inquiry function to open the application list and driving priorities included in the driving policy of the store A at the request for inquiry.

In addition, when the authenticated terminal of the manager (user) of the store A requests a change for the driving priorities of the particular location (the store A), the driving policy managing unit 130 can provide the inquiry function to change the driving priorities included in the driving policy of the store A at the request for change.

In addition, when the authenticated terminal of the manager (user) of the store A requests a deletion for the information providing service application of the particular location (the store A), the driving policy managing unit 130 can provide the deletion function to delete the information providing service application included in the driving policy of the store A at the request for deletion.

Figure 3:
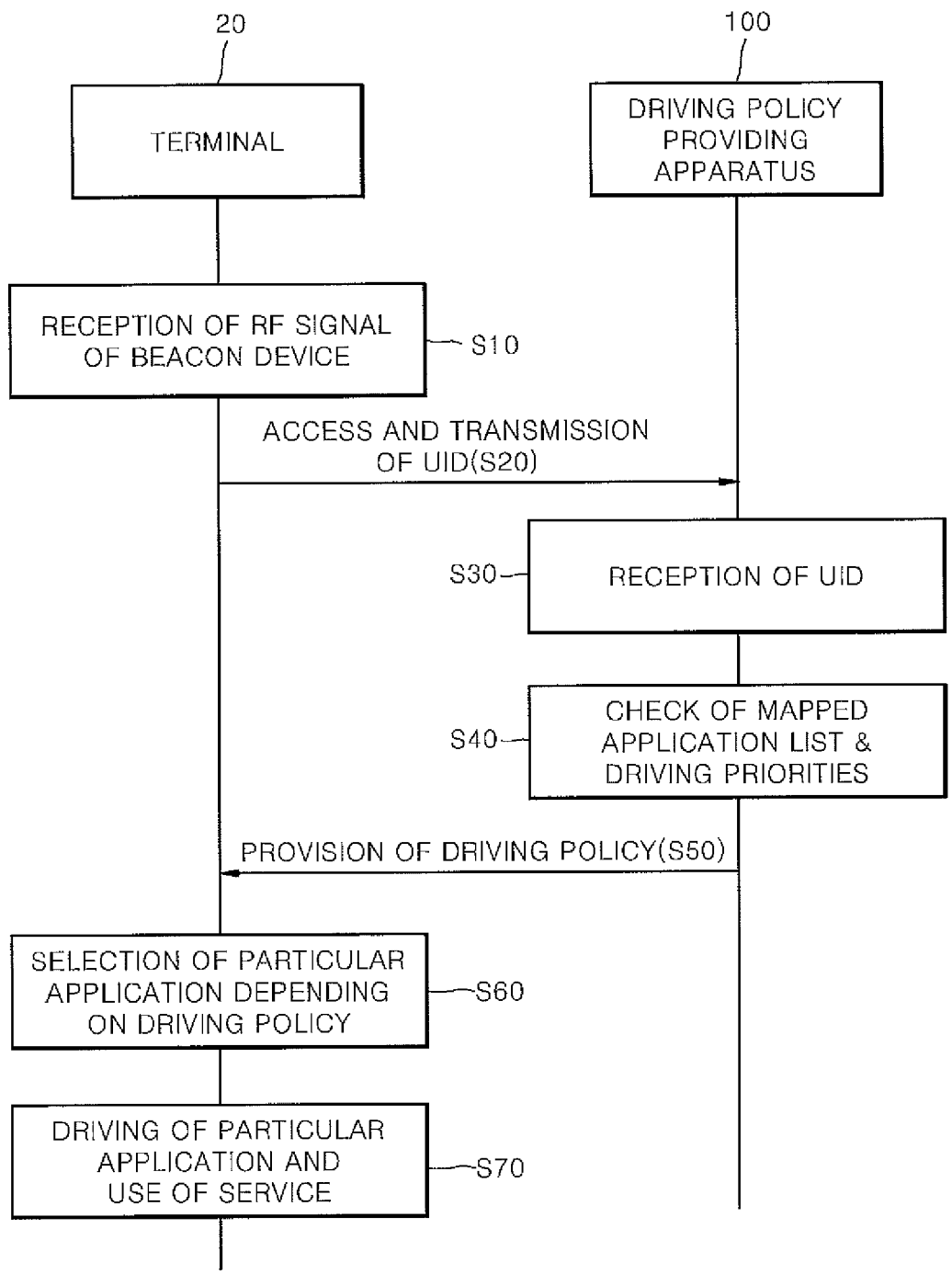
FIG. 3 is a view showing a flow of control of an application driving service method according to a preferred embodiment of the present invention.

According to the present invention, it is possible to provide an application driving service system and method which is capable of solving unnecessary application redundant driving in a terminal in a procedure of providing a service using a beacon device, thereby eliminating inconvenience of a user and wasteful increase in the amount of used data, a driving policy providing apparatus applied thereto, and a method for operating the apparatus, Hereinafter, an application driving service method according to a preferred embodiment of the present invention will be described with reference to FIGS. 3 and 4.

First, a control flow of the application driving service method according to the preferred embodiment of the present invention will be described with reference to FIG. 3.

The terminal 20 executes a BLE terminal agent as a background in the terminal 20 in order to use a Bluetooth-based information providing service.

When the terminal 20 is located in the reception region 1 within the particular distance from the beacon device 10 as the terminal 20 approaches or enters the particular location (for example, the store A), the BLE terminal agent being executed as the background in the terminal receives the RF signal from the beacon device 10 and recognizes the unique identification information (UID) of the particular location (for example, the store A) broadcast by the beacon device 10 through the RF signal received from the beacon device 10 (S10).

Thereafter, the terminal 20 (i.e., the BLE terminal agent), which recognized the unique identification information (UID) of the store A, accesses the driving policy providing apparatus 100 and transmits the recognized unique identification information (DID) of the particular location (for example, the store A) to the driving policy providing apparatus 100 (S20).

Upon receiving the unique identification information (UID) of the store A from the terminal 20 (S30), the driving policy providing apparatus 100 checks an application list mapped to the unique identification information (UID) of the store A and application driving priorities contained in the application list (S40).

Then, the driving policy providing apparatus 100 provides a driving policy including the checked application list and application driving priorities to the terminal 20 (S50).

Upon recognizing the unique identification information (UID) of the particular location (for example, the store A), the terminal 20 can automatically receive (acquire) the driving policy related to the unique identification information (UID) and select (S60) and drive (S70) a particular information providing service application (for example, BBB.apk) depending on the received driving policy.

Thus, the terminal 20 can access a service server (not shown) through the application BBB.apk selected and driven depending on the driving policy and receive information (for example, coupons, discount information, store information and so on) based on the unique identification information (UID) of the store A from the service server (not shown).

Hereinafter, a method for operating the driving policy providing apparatus according to a preferred embodiment of the present invention will be described in more detail with reference to FIG. 4.

In the method for operating the driving policy providing apparatus 100 according to the preferred embodiment, identification information of a particular location recognized by the terminal 20 is first received from the terminal 20 (S100).

Assuming the particular location as the store A as described above, when the terminal 20 is located in the reception region 1 within the particular distance from the beacon device 10 as the terminal 20 approaches or enters the particular location (the store A), the BLE terminal agent being executed as the background in the terminal 20 receives a RF signal from the beacon device 10.

Then, the terminal 20 (i.e., the BLE terminal agent) transmits the unique identification information (UID) of the recognized location (the store A) to the driving policy providing apparatus 100.

Accordingly, in the method for operating the identification information receiving unit 110, the unique identification information (UID) of the location (the store A) recognized by the terminal 20 can be received from the terminal.

Next, the list and priority checking unit 120 checks (S110) the application list mapped to the unique identification information (UID) and the application driving priorities contained in the application list, which are received in Step S100.

In more detail, the driving policy providing apparatus 100 can manage the application list containing applications as candidates to be driven for a Bluetooth-based information providing service (hereinafter referred to as information providing service applications), which is mapped to each beacons or unique identification information (UID) and driving priorities of the information providing service applications contained in the application list.

Then, upon receiving (S100) the unique identification information (UID) of the particular location (the store A) from the identification information receiving unit 110, the list and priority checking unit 120 can check the application list mapped to the received unique identification information (UID) of the store A and the driving priorities of the applications contained in the application list.

Then, driving policy providing unit 140 provides a driving policy including the application list and driving priorities checked in Step S110 to the terminal 20 (S120). Then, upon recognizing the unique identification information (UID) of the particular location (the store A), the terminal 20 can automatically receive (acquire) the driving policy related to the unique identification information (UID) from the driving policy providing apparatus 100 and select and drive a particular information providing service application depending on the received driving policy (S130).

In this case, the driving policy is a policy to select an information providing service application contained in the driving policy application list and having the highest driving priority, among existing information providing service applications installed in the terminal 20, as the particular information service application.

Accordingly, the terminal 20, particularly, the BLE terminal agent being executed as the background in the terminal 20, can select the particular information providing service application contained in the driving policy application list and having the highest driving priority, among the existing information providing service applications installed in the terminal 20, depending on the policy, and can drive the selected particular information providing service application only.

For example, it is assumed that applications BBB.apk, CCC.apk and DDD.apk are installed in the terminal 20.

In this case, if the terminal 20 receives the driving policy including the application list and driving priorities as shown in Table 1, the terminal 20 can select the particular information providing service application BBB.apk contained in the driving policy application list and having the highest driving priority, among the existing information providing service applications BBB.apk, CCC.apk and DDD.apk installed in the terminal 20, depending on the policy, and can drive the selected particular information providing service application BBB.apk only.

Then, the terminal 20 can access a service server (not shown) through the application BBB.apk selected and driven depending on the driving policy and receive information (for example, coupons, discount information, store information and so on) based on the unique identification information (UID) of the store A from the service server (not shown).

In addition, the driving policy providing apparatus according to the present invention can support user manipulation for the application list and driving priorities mapped/managed for unique identification information (UID). To this end, at a request from an authenticated terminal in association with the particular location (Yes in S140), the driving policy providing apparatus 100 according to the present invention provides at least one of functions of registration, inquiry, change and deletion for the application list and driving priorities included in a driving policy of a particular location (S150).

In more detail, the authenticated terminal in association with the particular location (for example, the store A) refers to a terminal which accesses the driving policy providing apparatus 100 through a preset authentication procedure (for example, input of ID and password) by a manager (user) of the store A joined in the application driving service of the present invention.

When the authenticated terminal of the manager (user) of the store A accessing the driving policy providing apparatus 100 through the preset authentication procedure requests registration of a new information providing service application for the particular location (the store A), the driving policy providing apparatus 100 can provide the registration function to register the new information providing service application in the driving policy application list of the store A at the request for registration.

In addition, when the authenticated terminal of the manager (user) of the store A requests an inquiry for the application list and driving priorities of the particular location (the store A), the driving policy providing apparatus 100 can provide the inquiry function to open the application list and driving priorities included in the driving policy of the store A at the request for inquiry.

In addition, when the authenticated terminal of the manager (user) of the store A requests a change for the driving priorities of the particular location (the store A), the driving policy providing apparatus 100 can provide the inquiry function to change the driving priorities included in the driving policy of the store A at the request for change.

In addition, when the authenticated terminal of the manager (user) of the store A requests a deletion for the information providing service application of the particular location (the store A), the driving policy providing apparatus 100 can provide the deletion function to delete the information providing service application included in the driving policy of the store A at the request for deletion.

Figure 4:
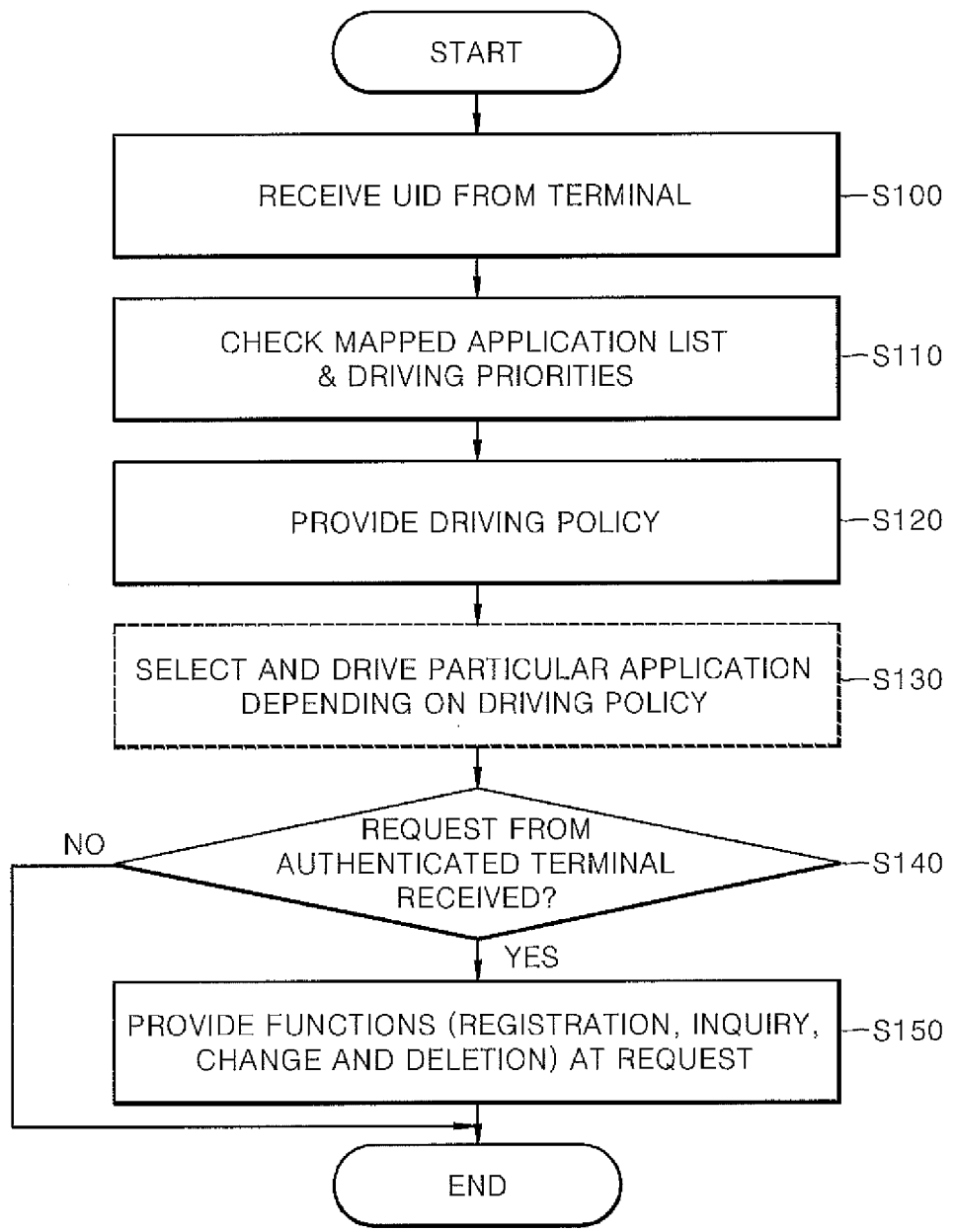
FIG. 4 is an operation flow diagram of the application driving service method according to a preferred embodiment of the present invention.

In this case, although it is shown in FIG. 4 that Steps S140 and S150 follow Step S130, this is only illustrative for convenience of description. The method of operating the driving policy providing apparatus 100 according to the present invention may check reception of registration, inquiry, change and deletion of the information providing service application from the authenticated terminal at all times independently of Steps S100 to S130 and provide the corresponding function at a request (S140 and S150).

According to the present invention, it is possible to provide an application driving service method and a method for operating the driving policy providing apparatus which are capable of solving unnecessary application redundant driving in a terminal in a procedure of providing a service using a beacon device (i.e., a Bluetooth-based information providing service), thereby eliminating inconvenience of a user and wasteful increase in the amount of used data.

The application driving service method and the method for operating the driving policy providing apparatus according to one embodiment of the present invention may be implemented in the form of program instructions capable of being executed by a variety of computing means and may be stored in computer-readable non-transitory media. The computer-readable media may store program instructions, data files, data structures and so on alone or in combination. Program instructions stored in the media may be specially designed and configured for the present invention or may be ones which are known and available to those skilled in the art of computer software. Examples of the media may include hardware devices specialized to store and execute program instructions, including magnetic media such as a hard disk, a floppy disk and a magnetic tape, optical media such as CR-ROM (Compact Disk Read Only Memory) and DVD (Digital Video Disk), magneto-optical media such as a floptical disk or the like, ROM, RAM (Random Access Memory), a flash memory, and so on. Examples of the program instructions may include machine language codes created by a compiler, and high level language codes which can be executed by a computer using an interpreter or the like. These hardware devices may be configured to be operated as one or more software modules to perform the operation of the present invention, and vice versa.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

INDUSTRIAL APPLICABILITY

With the application driving service system and method, the driving policy providing apparatus applied thereto, and the method for operating the apparatus according to the present invention, it is possible to solve unnecessary application redundant driving in a terminal in a procedure of providing a service using a beacon device, for example, a Bluetooth-based information providing service. Therefore, the present invention has industrial applicability since it can overcome the limitation of existing techniques and has sufficient commercial availability and operation performance and can be practiced in reality.

What is claimed is:

1. A running policy providing apparatus comprising:
  an identification information receiving unit which receives unique identification information of a particular location recognized by a terminal;
  a list and priority checking unit which checks an application list mapped to the unique identification information and running priorities of applications contained in the application list; and
  a running policy providing unit which provides a running policy including the checked application list and running priorities and selects and runs a particular application depending on the provided running policy when the terminal recognizes the unique identification information,
  wherein a beacon device which transmits a RF signal capable of being received in a terminal located within a particular distance is installed in the particular location, and
  wherein the unique identification information is information recognized through the RF signal received from the beacon device by the terminal located within a particular distance from the beacon device.

2. The running policy providing apparatus according to claim 1, wherein the running policy includes a policy to select an application contained in the application list and having the highest running priority, among existing applications installed in the terminal, as the particular application.

3. The running policy providing apparatus according to claim 1, further comprising a running policy managing unit which provides at least one of functions of registration, inquiry, change and deletion for the application list and running priorities included in a running policy of a particular location at a request from an authenticated terminal in association with the particular location.

4. The running policy providing apparatus according to claim 1, further comprising an installation guiding unit which guides installation of at least one application, which is selected from the existing information providing service applications contained in the application list depending on running priority of applications contained in the application list, in the terminal when failure information indicating failure in selecting the particular application is returned from the terminal to the running policy providing apparatus.

5. A method for operating a running policy providing apparatus, comprising:
  receiving unique identification information of a particular location recognized by a terminal;
  checking an application list mapped to the unique identification information and running priorities of applications contained in the application list; and
  providing a running policy including the checked application list and running priorities and selecting and running a particular application depending on the provided running policy when the terminal recognizes the unique identification information,
  wherein a beacon device which transmits a RF signal capable of being received in a terminal located within a particular distance is installed in the particular location, and
  wherein the unique identification information is information recognized through the RF signal received from the beacon device by the terminal located within a particular distance from the beacon device.

6. The method according to claim 5, wherein the running policy includes a policy to select an application contained in the application list and having the highest running priority, among existing applications installed in the terminal, as the particular application.

7. A non-transitory computer-readable storage medium storing a computer program comprising a set of instructions, when executed, arranged to cause a computer to implement the method according to claim 6.

8. The method according to claim 5, further comprising providing at least one of functions of registration, inquiry, change and deletion for the application list and running priorities included in a running policy of a particular location at a request from an authenticated terminal in association with the particular location.

9. A non-transitory computer-readable storage medium storing a computer program comprising a set of instructions, when executed, arranged to cause a computer to implement the method according to claim 8.

10. A non-transitory computer-readable storage medium storing a computer program comprising a set of instructions, when executed, arranged to cause a computer to implement the method according to claim 5.

11. An application running service system comprising:
  a terminal which recognizes unique identification information of a particular location, transmits the recognized unique identification information, and receives a running policy related to the unique identification information; and a running policy providing apparatus which receives the unique identification information from the terminal, checks an application list mapped to the unique identification information and running priorities of applications contained in the application list, provides a running policy including the checked application list and running priorities, and selects and runs a particular application depending on the provided running policy when the terminal recognizes the unique identification information, wherein a beacon device which transmits a RF signal capable of being received in a terminal located within a particular distance is installed in the particular location, and wherein the unique identification information is information recognized through the RF signal received from the beacon device by the terminal located within a particular distance from the beacon device.

* * * * *